United States Patent
Hsieh et al.

(10) Patent No.: US 10,129,713 B2
(45) Date of Patent: Nov. 13, 2018

(54) METHOD FOR GENERATING NOTIFICATION AND A MOBILE DEVICE AND SYSTEM USING THE SAME

(71) Applicant: HTC Corporation, Taoyuan (TW)

(72) Inventors: Hung-Tao Hsieh, Taoyuan (TW); Kuo-Chen Wu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 24 days.

(21) Appl. No.: 14/667,183

(22) Filed: Mar. 24, 2015

(65) Prior Publication Data
US 2016/0286366 A1 Sep. 29, 2016

(51) Int. Cl.
| | |
|---|---|
| *H04W 4/12* | (2009.01) |
| *H04B 1/3827* | (2015.01) |
| *H04W 4/70* | (2018.01) |
| *H04W 4/80* | (2018.01) |
| *H04W 8/00* | (2009.01) |
| *H04M 1/725* | (2006.01) |

(52) U.S. Cl.
CPC ............. *H04W 4/12* (2013.01); *H04B 1/385* (2013.01); *H04M 1/7253* (2013.01); *H04W 4/70* (2018.02); *H04W 4/80* (2018.02); *H04M 1/72527* (2013.01); *H04M 1/72569* (2013.01); *H04M 2215/8145* (2013.01); *H04M 2250/12* (2013.01); *H04W 8/005* (2013.01)

(58) Field of Classification Search
CPC .......... H04M 1/7253; H04M 2250/12; H04M 1/72527; H04W 4/008; H04W 76/023; H04W 8/005
See application file for complete search history.

(56) References Cited

U.S. PATENT DOCUMENTS

| | | | |
|---|---|---|---|
| 2014/0154987 A1* | 6/2014 | Lee | H04M 1/7253 455/41.2 |
| 2014/0189584 A1* | 7/2014 | Weng | G06F 3/04883 715/808 |
| 2015/0245186 A1* | 8/2015 | Park | H04W 4/008 455/417 |

(Continued)

FOREIGN PATENT DOCUMENTS

| | | |
|---|---|---|
| CN | 104407708 A | 3/2015 |
| TW | 201333750 A1 | 8/2013 |

(Continued)

*Primary Examiner* — Jaime Holliday
(74) *Attorney, Agent, or Firm* — Birch, Stewart, Kolasch & Birch, LLP

(57) ABSTRACT

A method for generating notification is provided. The method includes following steps. A mobile device is paired with a wearable device. The mobile device has a first motion sensor, and the wearable device has a second motion sensor. Notification synchronization is performed between the mobile device and the wearable device. When an event is triggered and a corresponding notification should be generated, the mobile device generates the corresponding notification if the first motion sensor senses a motion is later than the second motion sensor senses a motion. When an event is triggered and a corresponding notification should be generated, the wearable device generates the corresponding notification if the second motion sensor senses a motion is later than the first motion sensor senses a motion.

14 Claims, 2 Drawing Sheets

(56) References Cited

U.S. PATENT DOCUMENTS

| | | | | |
|---|---|---|---|---|
| 2016/0044151 A1* | 2/2016 | Shoemaker | ........... | H04M 19/04 455/556.1 |
| 2016/0063847 A1* | 3/2016 | Hawkins | ................ | G08B 21/24 340/539.11 |
| 2016/0063850 A1* | 3/2016 | Yang | ...................... | G08B 23/00 340/539.22 |

FOREIGN PATENT DOCUMENTS

| TW | 201335792 A1 | 9/2013 |
|---|---|---|
| TW | M497832 U | 3/2015 |

\* cited by examiner

METHOD FOR GENERATING NOTIFICATION AND A MOBILE DEVICE AND SYSTEM USING THE SAME

TECHNICAL FIELD

The disclosure relates in general to a method for generating notification and a mobile device and a system using the same, and more particularly to a method for generating notification applicable to a wearable device, and a mobile device and a system using the same.

BACKGROUND

Mobile device, such as smart phone, has become indispensable to modern people in their everyday life. The smart phone provides many reminder functions and is virtually a small-sized computer. For example, the smart phone has the function of alarm reminder, and will remind the user when receiving a text message. These reminder functions provide convenience of use to the user. As the smart phone is capable of providing more and more new functions, how to provide more suitable functions for improving the user's experience of use has become a prominent task for the industries.

SUMMARY

The disclosure is directed to a method for generating notification, and a mobile device and a system using the same. The mobile device can be paired with the wearable device. The user's current state of using the mobile device and the wearable device can be detected by the motion sensors of the mobile device and the wearable device, and at least one of the mobile device and the wearable device is selected to generate a corresponding notification. Thus, the generated notification will be more easily noticed by the user, and the nuisance of repeatedly generating notifications can thus be avoided.

According to one embodiment, a method for generating notification is provided. The method includes following steps. A mobile device is paired with a wearable device. The mobile device has a first motion sensor, and the wearable device has a second motion sensor. Notification synchronization is performed between the mobile device and the wearable device. When an event is triggered and a corresponding notification should be generated, the mobile device generates the corresponding notification if the first motion sensor senses a motion is later than the second motion sensor senses a motion. When an event is triggered and a corresponding notification should be generated, the wearable device generates the corresponding notification if the second motion sensor senses a motion is later than the first motion sensor senses a motion.

According to another embodiment, a system including a mobile device and a second processing unit is provided. The mobile device includes a first processing unit, a first motion sensor, a first communication module and a first notification module. The first motion sensor is coupled to the first processing unit. The first communication module is coupled to the first processing unit. The first notification module is coupled to the first processing unit. The wearable device includes a second processing unit, a second motion sensor, a second communication module and a second notification module. The second motion sensor, the second communication module and the second notification module are respectively coupled to the second processing unit. After the mobile device and the wearable device are paired by the first communication module and the second communication module respectively, notification synchronization is performed between the mobile device and the wearable device by the first processing unit and the second processing unit. When an event is triggered and a corresponding notification should be generated, the first notification module generates the corresponding notification if the first motion sensor senses a motion is later than the second motion sensor senses a motion. When an event is triggered and a corresponding notification should be generated, the second notification module generates the corresponding notification if the second motion sensor senses a motion is later than the first motion sensor senses a motion.

According to an alternate embodiment, a mobile device including a first processing unit, a first motion sensor, a first communication module and a first notification module is provided. The first motion sensor, the first communication module and the first notification module are respectively coupled to the first processing unit. After the mobile device is paired with a wearable device by the first communication module, notification synchronization is performed between the mobile device and the wearable device by the first processing unit, wherein the wearable device has a second motion sensor. When an event is triggered and a corresponding notification should be generated, the first notification module generates the corresponding notification if the first motion sensor senses a motion is later than the second motion sensor senses a motion. When an event is triggered and a corresponding notification should be generated, the wearable device generates the corresponding notification if the second motion sensor senses a motion is later than the first motion sensor senses a motion.

The above and other aspects of the invention will become better understood with regard to the following detailed description of the preferred but non-limiting embodiment(s). The following description is made with reference to the accompanying drawings.

DETAILED DESCRIPTION

According to an embodiment of the disclosure, a method for generating notification is provided. The method includes following steps. Firstly, a mobile device is paired with a wearable device, wherein the mobile device has a first motion sensor, and the wearable device has a second motion sensor. Then, notification synchronization is performed between the mobile device and the wearable device. When an event is triggered and a corresponding notification should be generated, the mobile device generates the corresponding notification if the first motion sensor senses a motion is later than the second motion sensor senses a motion. When an event is triggered and a corresponding notification should be generated, the wearable device generates the corresponding notification if the second motion sensor senses a motion is later than the first motion sensor senses a motion.

Figure 1:
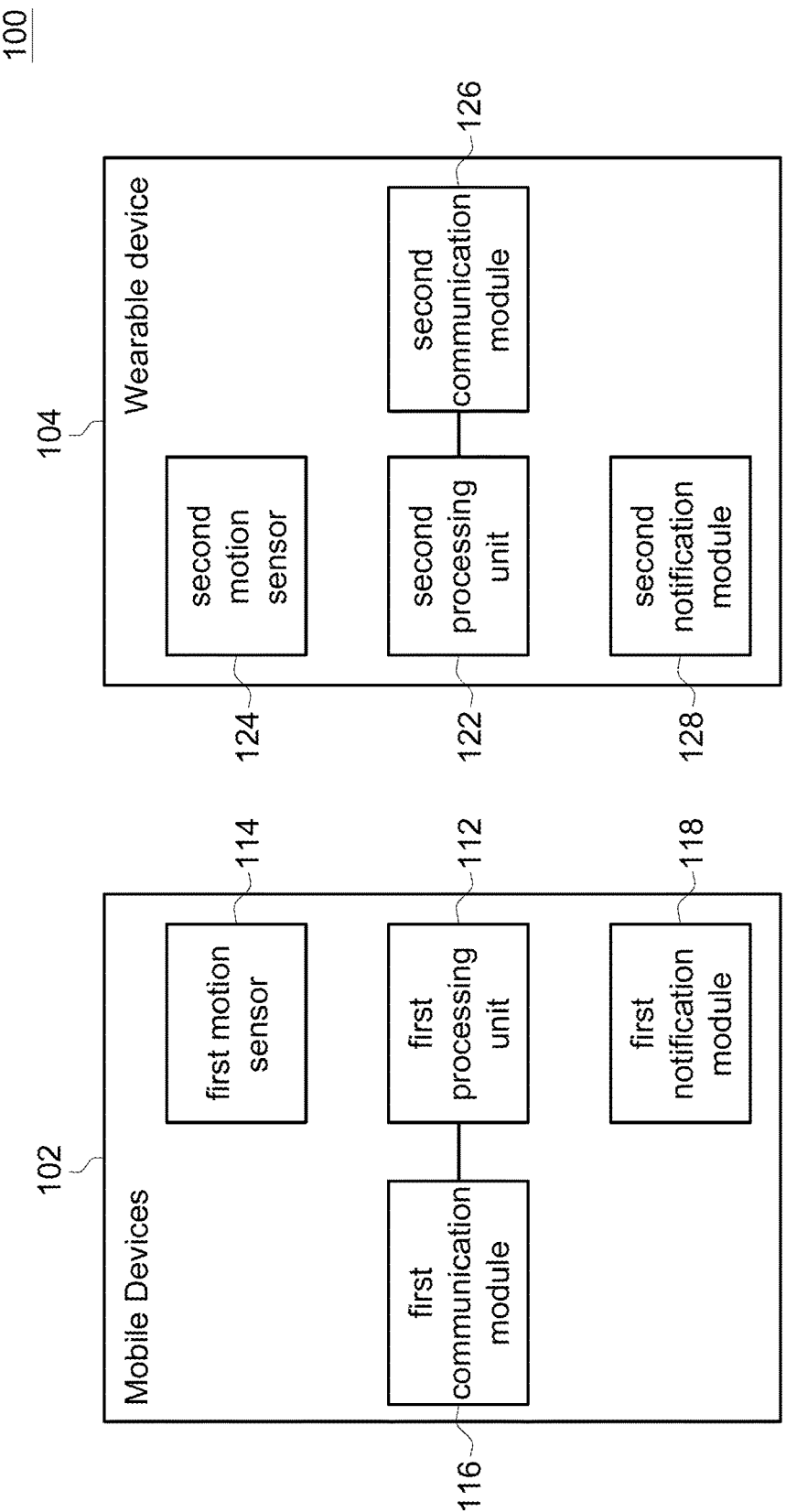
FIG. 1 is a system block diagram for implementing a method for generating notification according to a first embodiment of the disclosure.

The method for generating notification can be implemented by the system illustrated in FIG. 1. The system 100 includes a mobile device 102 and a wearable device 104.

The mobile device 102 includes a first processing unit 112, a first motion sensor 114, a first communication module 116 and a first notification module 118. The first motion sensor 114, the first communication module 116 and the first notification module 118 respectively are coupled to the first processing unit 112.

The wearable device 104 includes a second processing unit 122, a second motion sensor 124, a second communication module 126 and a second notification module 128. The second motion sensor 124, the second communication module 126 and the second notification module 128 respectively are coupled to the second processing unit 122.

After the mobile device 102 and the wearable device 104 are respectively paired by the first communication module 116 and the second communication module 126, notification synchronization is performed between the mobile device 102 and the wearable device 104 by the first processing unit 112 and the second processing unit 122 respectively. When an event is triggered and a corresponding notification should be generated, the first notification module 118 generates the corresponding notification if the first motion sensor 114 senses a motion is later than the second motion sensor 124 senses a motion. When an event is triggered and a corresponding notification should be generated, the second notification module 128 generates the corresponding notification if the second motion sensor 124 senses a motion is later than the first motion sensor 114 senses a motion.

Through the first motion sensor 114 of the mobile device 102 and the second motion sensor 124 of the wearable device 104, it can be determined whether the device lastly used by the user is the mobile device 102 or the wearable device 104, and whether the device worn on the user's body or carried at the user's hand or pocket is the mobile device 102 or the wearable device 104. It is most likely that the device lastly operated by the user is the device closest to the user or the device worn on the user. If the first motion sensor 114 senses a motion generated by the user is later than the second motion sensor 124 senses a motion generated by the user, it is more likely that the mobile device 102 is the device lastly operated by the user and the mobile device 102 is more likely closer to the user. Under such circumstance, the mobile device 102 generates the corresponding notification. Conversely, if the second motion sensor 124 senses a motion generated by the user is later than the first motion sensor 114 senses a motion generated by the user, it is more likely that the wearable device 104 is the device lastly operated by the user and the wearable device 104 is more likely closer to the user. Under such circumstance, the wearable device 104 generates the corresponding notification. By selecting the device lastly operated by the user to generate the corresponding notification, the generated notification can be easily noticed by the user, and the nuisance caused by the repeatedly generated notifications can be avoided.

The mobile device 102 can be a mobile phone or a Tablet PC. The mobile phone can be, for example, a smart phone. The wearable device 104 can be at least one of a watch, a necklace, a bracelet, a headset, and a pair of glasses. The wearable device 10 is similar to a mobile assistant, and provides a variety of functions such as calorie calculating, sleep recording, GPS positioning and several notification functions. Examples of notification include at least one of alarm reminder notification, e-mail notification, text message notification, incoming call notification and calendar event notification. Each of the first communication module 116 and the second communication module 126 can be, for example, a Wi-Fi communication module, a Zigbee communication module, or a Bluetooth communication module.

The first notification module 118 and the second notification module 128 can generate notifications for different events by displaying different patterns or messages, or making different sounds, emitting different color lights, or making different vibrations.

Besides, when an event is triggered and a corresponding notification should be generated, the mobile device 102 generates the corresponding notification if the second motion sensor 124 and the first motion sensor 114 both sense a motion substantially at the same time. This implies that the user may concurrently use the mobile device 102 and the wearable device 104 when an event is triggered and a corresponding notification should be generated. Under such circumstance, it would be easier to arouse the user's attention if the corresponding notification is generated by the mobile device 102 having more versatile functions.

Figure 2:
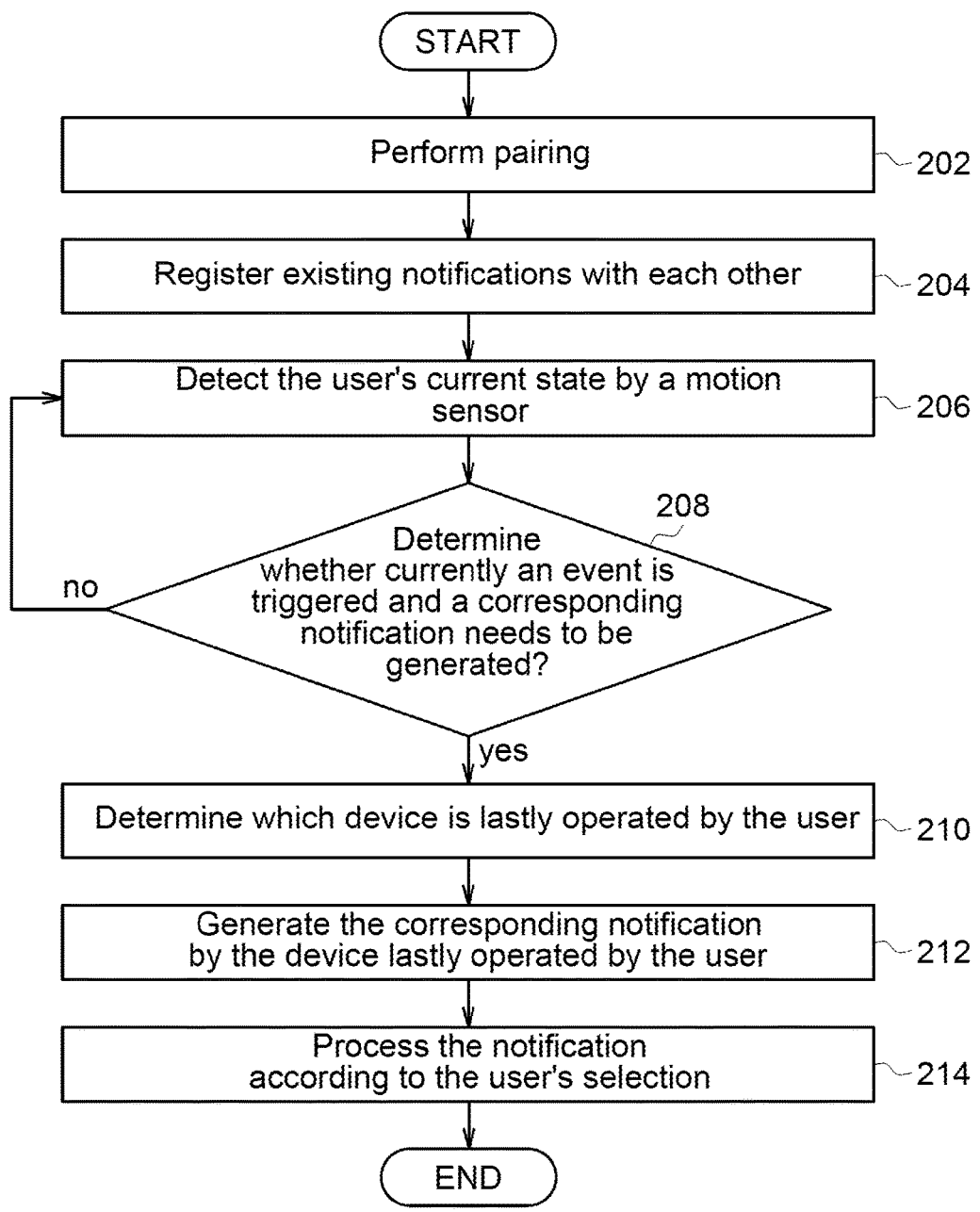
FIG. 2 is an example of a flowchart of a method for generating notification according to an embodiment of the disclosure.

Detailed descriptions of an embodiment of the disclosure are disclosed below with a flowchart. Referring to FIG. 2, an example of a flowchart of a method for generating notification according to an embodiment of the disclosure is shown. Firstly, the method begins at step 202, a mobile device 102 having communication function is paired with a wearable device 104, such that the mobile device 102 and the wearable device 104 are under the state of being interconnected. Then, the method proceeds to step 204, the mobile device 102 and the wearable device 104 register existing notifications with each other, that is, notification synchronization is performed between the mobile device 102 and the wearable device 104, so that the wearable device 104 is allowed to receive all notifications of the mobile device 102 and the mobile device 102 is also allowed to receive all notifications of the wearable device 104. After the mobile device 102 and the wearable device 104 are synchronized, the mobile device 102 and the wearable device 104 have the same notifications.

Then, the method proceeds to step 206, the user's current state is detected by the first motion sensor 114 of the mobile device 102 and the second motion sensor 124 of the wearable device 104 respectively. If the user holds or carries the mobile device 102 and the user is not still, then the first motion sensor 114 will sense a motion of the user. If the user holds or carries the wearable device 104 and the user is not still, then the second motion sensor 124 will sense a motion of the user. The first motion sensor 114 and the second motion sensor 124 can, for example, provide acceleration value, gravity acceleration value, rotation angle value, location coordinates, linear acceleration value, and pressure sensing value. The user's current state can be determined according to these sensed values. For example, whether the user currently is moving, resting or sleeping can be determined.

Then, the method proceeds to step 208, it is determined whether currently an event is triggered and a corresponding notification needs to be generated. For example, if the current time is already the set time for the alarm, then an alarm reminder event will be triggered, and the device must inform the user of the alarm reminding event. The notification can be realized in the form of ringing a tone. When the current mail box of the mobile device 102 receives a new mail, the mobile device must inform the user of the event of receiving a new mail. The notification can be realized by displaying a specific pattern or making a reminder sound on the mobile device 102 or the wearable device 104. In another example, when the device receives a new text message, the device must inform the user of the event of receiving a new text message. The notification can be realized by a displaying a specific pattern or making a reminder sound on the mobile device 102 or the wearable device 104. In further another example, when an appointment is starting soon in the current calendar application, the device must inform the user of the coming appointment. The notification can be realized by displaying the topic of the appointment.

Then, the method proceeds to step 210, which of the mobile device 102 and the wearable device 104 is the device lastly operated by the user is determined. That is, which of the mobile device 102 and the wearable device 104 is the device lastly operated by the user is determined according to the first motion sensor 114 sense a motion and the second motion sensor 124 sense a motion. If the first motion sensor 114 senses a motion generated by the user is later than the second motion sensor 124 senses a motion generated by the user, it is determined that the mobile device 102 is the device lastly operated by the user. Conversely, if the second motion sensor 124 senses a motion generated by the user is later than the first motion sensor 114 senses a motion generated by the user, it is determined that the wearable device 104 is the device lastly operated by the user. The device lastly operated by the user could be the device lastly touched by the user or the device currently worn on the user. For example, if the user wears the wearable device 104 (used as a bracelet or a watch) and leaves the mobile device 102 (such as a mobile phone) on the desk, then the wearable device 104 will move or wobble along with the movement or motion of the user's body, and the second motion sensor 124 of the wearable device 104 will sense a motion. For example, the value of acceleration or the coordinates of location will change. Since the mobile device 102 is left still on the desk, the first motion sensor 112 of the mobile device 102 will not sense any motions. Under such circumstance, it can be determined that the wearable device 104 is the device lastly operated by the user. In another scenario, the user does not wear the wearable device 104 but is operating the mobile device 102 at hand, then it can be determined that the mobile device 102 is the device lastly operated by the user.

Then, the method proceeds to step 212, the corresponding notification is generated by the device lastly operated by the user, that is, the device lastly operated by the user as determined in step 210. If the wearable device 104 is the device lastly operated by the user, then the wearable device 104 generates the corresponding notification, and the mobile device 102 does not generate the corresponding notification. For example, the wearable device 104 can ring the tone corresponding to the alarm reminder event, and the mobile device 102 does not ring the tone. If the mobile device 102 is the device lastly operated by the user, then the mobile device 102 generates the corresponding notification, and the wearable device 104 does not generate the corresponding notification. For example, the mobile device 102 can ring the tone corresponding to the alarm reminder event and the wearable device 104 does not ring the tone. In the conventional method, when an alarm reminder event is triggered, it is possible that both the mobile device 102 and the wearable device 104 may ring a tone. Meanwhile, if the user is not in the vicinity of the mobile device 102 or the wearable device 104, the tone may last for several minutes and become an annoying noise to the environment and cause nuisance to people around. According to the embodiment of the disclosure, the corresponding notification is generated by the mobile device 102 or the wearable device 104 lastly operated by the user (most likely, the device closer to the user) and the other device does not generate the corresponding notification, such that the nuisance or interference caused in the absence of the user can thus be avoided. In the conventional method, it is possible that the user is not in the vicinity of the mobile device and therefore does not notice the notification. According to the embodiment of the disclosure, since the corresponding notification is generated by whichever of the mobile device 102 or the wearable device 104 closer to the user (normally, the user wears the wearable device 104 continually), it is more likely that the user will notice the notification generated when an event is triggered and will be less likely to neglect a generated notification.

Then, the method proceeds to step 214, the notification is processed according to the user's selection. The user's selection includes, for example, "Confirm", "Remind me later", and "Cancel". If the user selects "Remind me later", then this notification will be listed as a pending notification and the method returns to step 206. If the user selects "Cancel", then this notification will be cancelled. The current device on which the user selects "Cancel" will inform the paired device by way of broadcasting. For example, if the user selects "Cancel" on the mobile device 102, then the mobile device 102 will inform the wearable device 104 by way of broadcasting.

In the conventional method, a corresponding notification may be continuously generated by an unattended device and cause interference to the environment, and the mobile device 102 and the wearable device 104 may generate the corresponding notification at the same time. The embodiment of the disclosure avoids the corresponding notification being repeatedly generated by an unattended device or being generated by the mobile device 102 and the wearable device 104 at the same time. In comparison to the conventional method in which a corresponding notification may be neglected when the user is not in the vicinity, the embodiment of disclosure generates the corresponding notification by using whichever of the mobile device 102 and the wearable device 104 closer to the user, such that the user is more aware of the corresponding notification generated when an event is triggered and less likely to neglect the received notification.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for generating notification, comprising:
pairing a mobile device with a wearable device, wherein the mobile device has a first motion sensor, and the wearable device has a second motion sensor;
performing notification synchronization between the mobile device and the wearable device, wherein the notification synchronization is performed by receiving, by the wearable device, notifications of the mobile device and receiving, by the mobile device, notifications of the wearable device so that the mobile device and the wearable device register existing notifications with each other and the mobile device and the wearable device have the same notifications;
detecting a user's current state by the first motion sensor of the mobile device and the second motion sensor of the wearable device respectively;
determining whether currently an event is triggered and a corresponding notification needs to be generated;
determining which of the mobile device and the wearable device is the device lastly operated by the user; and
generating the corresponding notification by the device lastly operated by the user;

wherein when the event is triggered and the corresponding notification should be generated, the mobile device generates the corresponding notification if the first motion sensor senses a motion is later than the second motion sensor senses a motion;

wherein when the event is triggered and the corresponding notification should be generated, the wearable device generates the corresponding notification if the second motion sensor senses a motion is later than the first motion sensor senses a motion; and wherein when an event is triggered and a corresponding notification should be generated, the mobile device generates the corresponding notification if the second motion sensor and the first motion sensor both sense a motion substantially at the same time.

2. The method according to claim 1, wherein the wearable device is at least one of a watch, a necklace, a bracelet, a headset, and a pair of glasses.

3. The method according to claim 1, wherein the notification is at least one of an alarm reminder notification, an e-mail notification, a text message notification, an incoming call notification and a calendar event notification.

4. A system, comprising:
a mobile device, comprising:
a first processing unit;
a first motion sensor coupled to the first processing unit;
a first communication module coupled to the first processing unit; and
a first notification module coupled to the first processing unit; and
a wearable device, comprising:
a second processing unit;
a second motion sensor coupled to the second processing unit;
a second communication module coupled to the second processing unit; and
a second notification module coupled to the second processing unit;
wherein after the mobile device and the wearable device are paired by the first communication module and the second communication module respectively, notification synchronization is performed between the mobile device and the wearable device by the first processing unit and the second processing unit respectively, wherein the notification synchronization is performed by receiving, by the wearable device, notifications of the mobile device and receiving, by the mobile device, notifications of the wearable device so that the mobile device and the wearable device register existing notifications with each other and the mobile device and the wearable device have the same notifications;
wherein a user's current state is detected by the first motion sensor of the mobile device and the second motion sensor of the wearable device respectively;
wherein by at least one of the mobile device and the wearable device, whether currently an event is triggered and a corresponding notification needs to be generated is determined, which of the mobile device and the wearable device is the device lastly operated by the user is determined, and the corresponding notification by the device lastly operated by the user is generated;
wherein when the event is triggered and the corresponding notification should be generated, the first notification module generates the corresponding notification if the first motion sensor senses a motion is later than the second motion sensor senses a motion;

wherein when the event is triggered and the corresponding notification should be generated, the second notification module generates the corresponding notification if the second motion sensor senses a motion is later than the first motion sensor senses a motion; and wherein when an event is triggered and a corresponding notification should be generated, the first notification module generates the corresponding notification if the second motion sensor and the first motion sensor both sense a motion substantially at the same time.

5. The system according to claim 4, wherein the wearable device is at least one of a watch, a necklace, a bracelet, a headset, and a pair of glasses.

6. The system according to claim 4, wherein the notification is at least one of an alarm reminder notification, an e-mail notification, a text message notification, an incoming call notification and a calendar event notification.

7. The system according to claim 4, wherein each of the first communication module and the second communication module is a Wi-Fi communication module, a Zigbee communication module, or a Bluetooth communication module.

8. The system according to claim 4, wherein the first notification module and the second notification module perform notification for different events by displaying different patterns or messages, making different sounds, emitting different color lights, or making different vibrations.

9. A mobile device, comprising:
a first processing unit;
a first motion sensor coupled to the first processing unit;
a first communication module coupled to the first processing unit; and
a first notification module coupled to the first processing unit;
wherein after the mobile device is paired with a wearable device by the first communication module, notification synchronization is performed between the mobile device and the wearable device by the first processing unit, and the wearable device has a second motion sensor, wherein the notification synchronization is performed by receiving, by the wearable device, notifications of the mobile device and receiving, by the mobile device, notifications of the wearable device so that the mobile device and the wearable device register existing notifications with each other and the mobile device and the wearable device have the same notifications;
wherein a user's current state is detected by the first motion sensor of the mobile device and the second motion sensor of the wearable device respectively;
wherein by at least one of the mobile device and the wearable device, whether currently an event is triggered and a corresponding notification needs to be generated is determined, which of the mobile device and the wearable device is the device lastly operated by the user is determined, and the corresponding notification by the device lastly operated by the user is generated;
wherein when the event is triggered and the corresponding notification should be generated, the first notification module generates the corresponding notification if the first motion sensor senses a motion is later than the second motion sensor senses a motion;
wherein when the event is triggered and the corresponding notification should be generated, the wearable device generates the corresponding notification if the second motion sensor senses a motion is later than the first motion sensor senses a motion; and wherein when an event is triggered and a corresponding notification should be generated, the first notification module generates the corresponding notification if the second motion sensor and the first motion sensor both sense a motion substantially at the same time.

10. The mobile device according to claim 9, wherein the wearable device is at least one of a watch, a necklace, a bracelet, a headset, and a pair of glasses.

11. The mobile device according to claim 9, wherein the notification is at least one of an alarm reminder notification, an e-mail notification, a text message notification, an incoming call notification and a calendar event notification.

12. The mobile device according to claim 9, wherein the first communication module is a Wi-Fi communication module, a Zigbee communication module, or a Bluetooth communication module.

13. The mobile device according to claim 9, wherein the first notification module performs notification for different events by displaying different patterns or messages, or making different sounds, emitting different color lights, or by making different vibrations.

14. The mobile device according to claim 9, wherein the mobile device is a mobile phone or a Tablet PC.

* * * * *